United States Patent
Womack

(10) Patent No.: US 6,568,126 B2
(45) Date of Patent: *May 27, 2003

(54) DEVICE TO SECURE LINING SHEET TO POND BORDER

(76) Inventor: William L. Womack, c/o Oly Ola Salos, Inc., 124 E. St. Charles Rd., Villa Park, NV (US) 60181

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/534,369

(22) Filed: Mar. 24, 2000

(65) Prior Publication Data

US 2002/0139045 A1 Oct. 3, 2002

(51) Int. Cl.⁷ .................................... A01G 1/00
(52) U.S. Cl. ............................................. 47/33
(58) Field of Search ................. 217/33; 404/7; 52/102, 169.7; 4/506

(56) References Cited

U.S. PATENT DOCUMENTS

| | | | |
|---|---|---|---|
| 2,654,180 A | 10/1953 | Redfield | |
| 2,713,751 A * | 7/1955 | Hendrixson | 47/33 |
| 3,777,421 A | 12/1973 | Bomba et al. | |
| 3,785,099 A * | 1/1974 | Greene | 52/102 |
| 3,868,732 A * | 3/1975 | Engelhart | 4/496 |
| D257,064 S | 9/1980 | Kobee | |
| 4,219,941 A | 9/1980 | Hair | |
| 4,372,079 A | 2/1983 | Trageser | |
| 4,663,883 A | 5/1987 | Hilliard et al. | |
| 4,809,459 A | 3/1989 | Brylla et al. | |
| 4,831,776 A | 5/1989 | Fritch | |
| 4,991,294 A * | 2/1991 | Breiner et al. | 4/506 |
| RE33,550 E * | 3/1991 | Jones | 404/7 |
| 5,212,917 A | 5/1993 | Kurtz et al. | |
| D336,220 S | 6/1993 | Grimes | |
| D339,199 S | 9/1993 | Rynberk | |
| 5,377,447 A | 1/1995 | Fritch | |
| 5,408,706 A * | 4/1995 | Barnes | 4/506 |
| 5,421,118 A | 6/1995 | Bauer | |
| D366,191 S | 1/1996 | Gay | |
| D372,547 S | 8/1996 | Sjödin | |
| D378,857 S | 4/1997 | Hale | |
| 5,640,801 A | 6/1997 | Rynbeck | |
| 5,720,056 A * | 2/1998 | Aymes | 4/506 |
| 5,857,288 A * | 1/1999 | Wiste | 47/33 |
| 6,230,451 B1 * | 5/2001 | Stoller | 220/9.4 |

FOREIGN PATENT DOCUMENTS

WO      WO-94/28704    * 12/1994

OTHER PUBLICATIONS

Oly–Ola Sales, Inc., 4–page brochure, undated–admitted prior art.

* cited by examiner

Primary Examiner—Charles T. Jordan
Assistant Examiner—Francis T. Palo
(74) Attorney, Agent, or Firm—Wood, Phillips, Katz, Clark & Mortimer

(57) ABSTRACT

An outer margin of a lining sheet is secured to a land border of a pond by a device comprising an elongate member and a plurality of fasteners, such as metal or polymeric stakes. The elongate member defines a wall and a flange projecting from the wall, meeting the wall at a junction dividing the wall into an upper portion and a lower portion, and being divided into a series of tabs enabling the wall to flex, each tab having a preformed hole. Each fastener has a pointed shank, which is driven through the preformed hole of a respective one of the tabs of the flange, through the outer margin of the lining sheet, into the land border of the pond, whereby to secure the outer margin of the lining sheet to the land border of the pond so that the upper portion of the wall projects upwardly and defines a landscaping or hardscaping border and so that the lower portion of the wall projects downwardly into the pond to limit uplifting of the lining sheet.

5 Claims, 2 Drawing Sheets

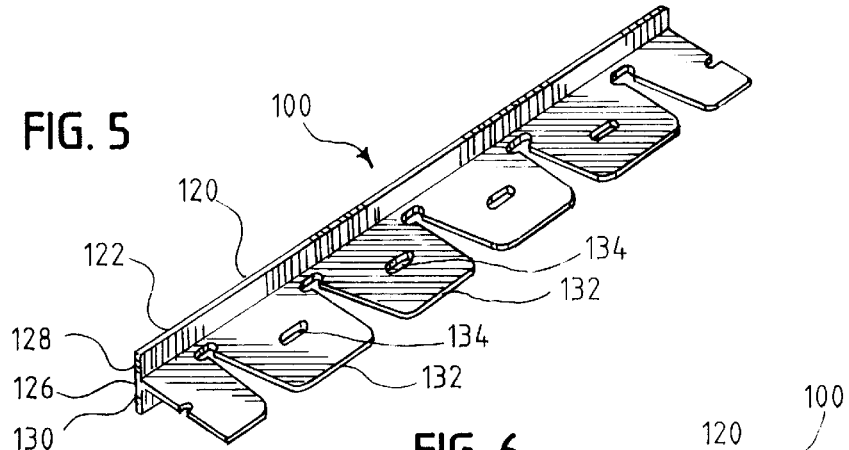
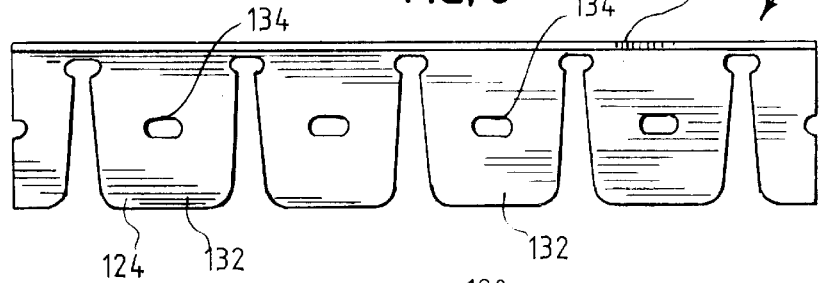
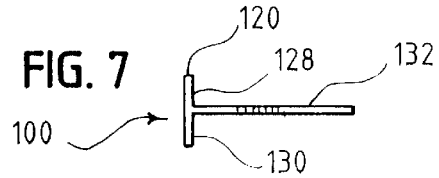
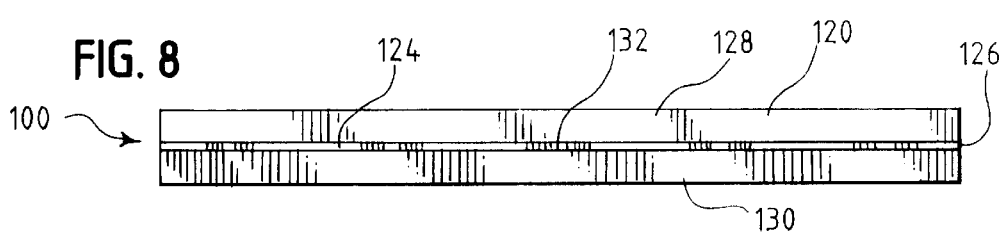
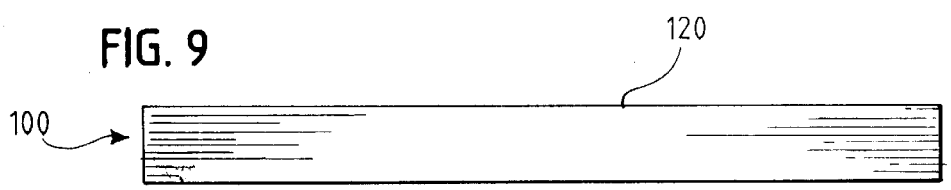

DEVICE TO SECURE LINING SHEET TO POND BORDER

TECHNICAL FIELD OF THE INVENTION

This invention pertains to a device to secure an outer margin of a lining sheet to a land border of a pond, which may be water-filled, as in a garden.

BACKGROUND OF THE INVENTION

In landscaping, it is common to line man-made or natural ponds with lining sheets (pond liners) of polymeric materials, such as polyethylene or polypropylene. It is known to secure a lining sheet at its outer margin to a land border of a pond by means of stakes driven through the outer margin, into the land border or into timbers underlying the outer margin, by means of heavy objects placed on the outer margin, such as bricks, blocks, timbers, rocks, or gravel, or by both such means.

Without such heavy objects placed on the outer margin, such stakes may not be entirely satisfactory, as the outer margin of the lining sheet may become torn from such stakes. It is a practical necessity to place many landscaping and hardscaping materials so as to be outwardly spaced from the pond and so as not to cover some of the outer margin of the lining sheet, as neither of such means provides anything to prevent any of those materials from slipping into the pond.

SUMMARY OF THE INVENTION

This invention provides a device to secure an outer margin of a lining sheet to a land border of a pond, which may be water-filled, as in a garden. The device comprises an elongate member, which is employed as a surround. Preferably, the elongate member is made preferably from a suitable, polymeric material, such as black poly(vinyl chloride) containing impact modifiers or such as polyeethylene, as by extruding and punching. Alternatively, the elongate member is made from a sheet of a suitable metal, such as a steel or aluminum sheet, as by extruding and punching or as by roll-forming.

Broadly, the elongate member defines a wall and a flange projecting from the wall. Preferably, the flange meets the wall at a junction dividing the wall into an upper portion and a lower portion. Broadly, the device comprises a fastener having a pointed shank, such as a metal or polymeric stake. Preferably, the fastener may be one of a plurality of similar fasteners, which when utilized are spaced from one another along the flange.

The pointed shank of each fastener is arranged to be driven through the flange, which may have a preformed hole to receive the pointed shank, through the outer margin of the lining sheet, into the land border of the pond, whereby to secure the outer margin of the lining sheet to the land border of the pond so that the wall, at the upper portion if the wall is divided as mentioned above, projects upwardly and defines a landscaping or hardscaping border and, if the wall is divided as mentioned above, so that the lower portion of the wall projects downwardly into the pond to limit uplifting of the lining sheet.

Preferably, the flange is divided into a series of tabs enabling the wall to flex and the fastener is one of a plurality of fasteners, each of which is arranged to be driven through one of the tabs, through the outer lining of the tabs, into the land border of the pond. Each tab may have a fastener or some but not all tabs may have fasteners.

Advantageously, landscaping materials, such as soil with or without grass or other plants having shallow roots, hardscaping materials, such as bricks, blocks, boulders, timbers, or gravel, can be thus placed onto the flange, against the wall, at the upper portion if the wall is divided as mentioned above. Thus, as far as the wall extends above the flange, the wall confines those materials and helps to prevent any of those materials from slipping into the pond.

Advantageously, the elongate member protects the outer margin of the lining sheet against direct contact with sunlight, which could cause ultraviolet degradation of the lining sheet, at its outer margin, if its outer margin were unprotected.

These and other objects, features, and advantages of this invention are evident from the following description of a preferred embodiment of this invention, with reference to the accompanying drawings.

BRIEF DESCRIPTION OF THE DRAWINGS

FIG. 4 shows that that the elongate member is flexible into various convex and concave curvatures.

FIG. 4 is a partly broken away, perspective view of the elongate member, as seen from an upper, front, left vantage. FIGS. 5, 6, 7, and 8 respectively are a top plan view of the elongate member, an elevational view of one end of the elongate member, the other end being a mirror image of the end shown, a front, elevational view of the elongate member, and a rear, elevational view of the elongate member.

DETAILED DESCRIPTION OF THE PREFERRED EMBODIMENT

Figure 1:
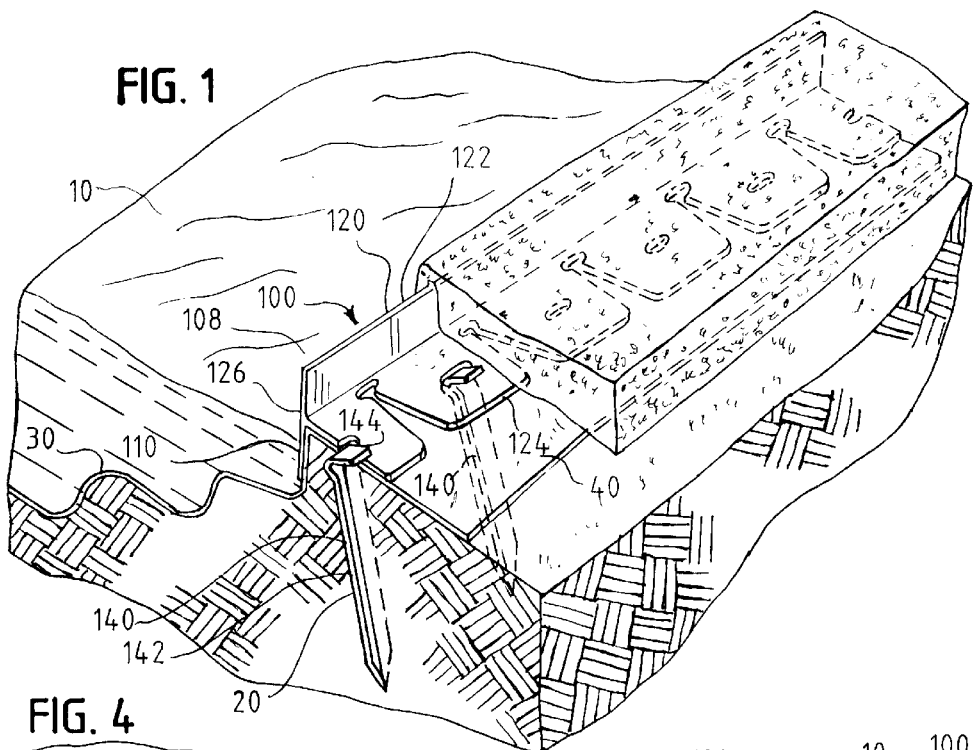
FIG. 1 is a perspective view of a device constituting a preferred embodiment of this invention, comprising an elongate member, and comprising stakes as fasteners, as employed to secure a lining sheet to a land border of a pond and as covered by landscaping materials including turf, vegetation, and like materials.
Figure 4:
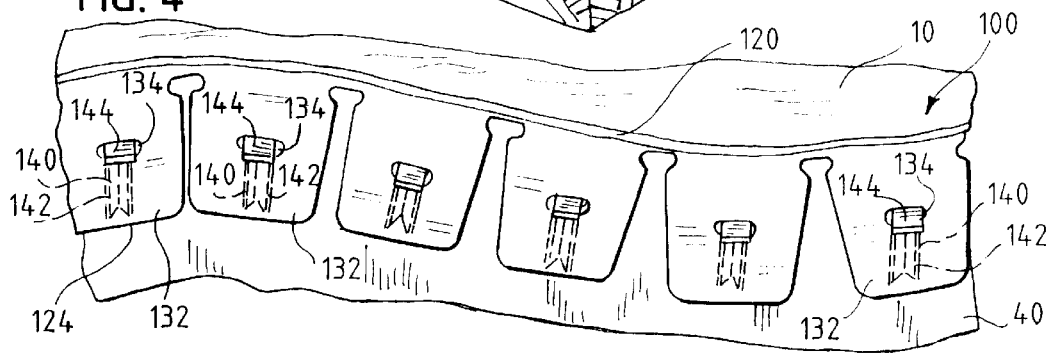
FIG. 4 is a top plan view of a pond, the elongate member, and fasteners, as shown without such landscaping or hardscaping materials.

As shown in FIGS. 1 through 4, in which a pond 10 being filled substantially with water and having a land border 20 and a lining sheet 30 having an outer margin 40 overlying the land border 20 are shown, a device 100 constituting the preferred embodiment of this invention, comprising an elongate member 120, and comprising a plurality of stakes 140 can be advantageously employed to secure the outer margin 40 of the lining sheet 30 to the land border 20 of the pond 10.

Figure 2:
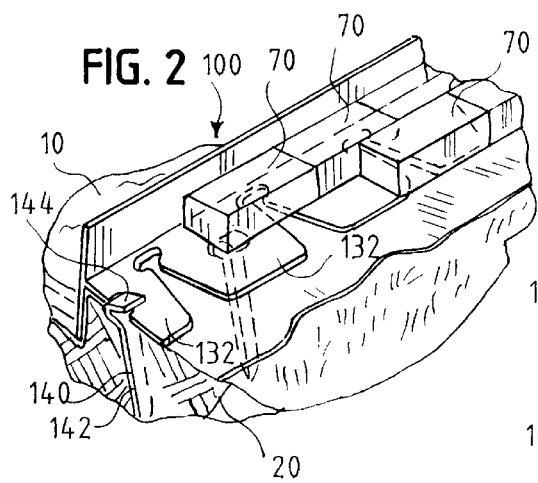
FIGS. 2 and 3 are similar views, in which the device is covered by hardscaping materials, namely bricks in FIG. 2 and gravel in FIG. 3, rather than by landscaping materials including vegetation.

As shown in FIGS. 5 through 9, the elongate member 120 is made so as to define a wall 122 and a flange 124, which projects from the wall 122 and which meets the wall 122 at a junction 126 dividing the wall 122 into an upper portion 128 and a lower portion 130. The flange 124 projects perpendicularly from the wall 122 when the elongate member 120 is unstressed. The flange 124 is divided into a series of similar tabs 132, as shown, which enable the wall 122 to flex convexly or concavely, as shown in FIG. 2. Each tab 132 has a preformed hole 134 to receive a stake 140. For use along straight-edged ponds, the flange 124 would not have to be so divided but would have a series of such holes 134 to receive stakes 140, the holes 134 being spaced from one another along the flange 124.

The elongate member 120 has an indefinite length but can be conveniently made in standard lengths, e.g. six, eight, or ten feet. Presently, a standard length of seven and one-half feet is preferred. Preferably, the flange 104 projects from about six inches to about eight inches from the junction 106, the upper portion 108 of the wall 102 projects upwardly about two inches from the junction 106, and the lower portion 110 of the wall 102 projects downwardly about two inches from the junction 106. These dimensions can be widely varied.

Being made of a suitable metal, such as steel, which is preferred, or from a suitable polymer, each stake 140 has a pointed shank 142 and an enlarged head 144, which is larger in cross-section when compared to any of the preformed holes 134. Similar stakes have been employed heretofore in known landscaping, hardscaping, and other applications. The pointed shank 142 of each stake 140 is driven downwardly through the preformed hole 134 of a respective one of the tabs 132 of the flange 124, through the outer margin 40 of the lining sheet 30, into the land border 20 of the pond 10, so that the head of said stake 140 bears on the flange 124, at the margin 136 of the preformed hole. Preferably, each tab 132 has a stake 140. Alternatively, some but not all tabs 132 have stakes 140.

As arranged to be thus driven into the land border 20 of the pond 10, the pointed shank 142 of each stake 140 can be alternatively driven into a timber (not shown) underlying the outer margin 40 of the lining sheet 30 or into some other substrate (not shown) underlying the outer margin 40 of the lining sheet 30.

Figure 3:
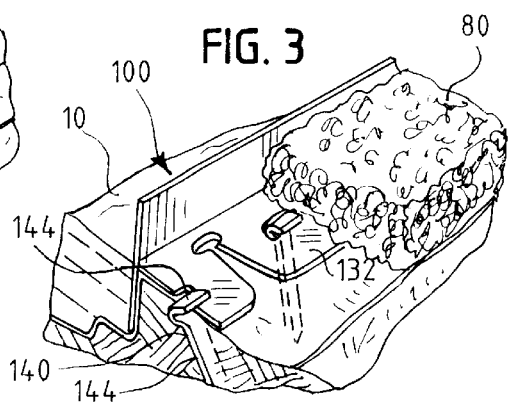

As shown in FIG. 1, the device 100 can be then covered with landscaping materials including vegetation 60 with shallow roots, as far inwardly as the upper portion 128 of the wall 122, or, as shown in FIGS. 2 and 3, with hardscaping materials, namely brick pavers 70 in FIG. 2 and gravel 80 in FIG. 3, as far inwardly as the upper portion 128 of the wall 122. As far as it extends above the flange 124, the upper portion 128 of the wall 122 confines those materials 60, 70, 80 and helps to prevent any of those materials 60, 70, 80 from slipping into the pond 10. The lower portion 130 of the wall 122 projects downwardly into the pond 10 to limit uplifting of the lining sheet 30.

Advantageously, the elongate member 120 protects the outer margin 40 of the lining sheet 30 against direct contact with sunlight, which could cause ultraviolet degradation of the lining sheet 30, at its outer margin 40, if its outer margin 40 were unprotected.

What is claimed is:

1. A combination comprising a lining sheet with an outer margin and a device securing the outer margin of the lining sheet to a land border of a pond, the device comprising an elongate member defining a wall and a flange, the flange projecting from the wall and meeting the wall at a junction dividing the wall into an upper portion and a lower portion, and a fastener having a pointed shank driven through the flange, through the outer margin of the lining sheet, into the land border of the pond, whereby to secure the outer margin of the lining sheet to the land border of the pond so that the upper portion of the wall projects upwardly and defines a landscaping or hardscaping border and so that the lower portion of the wall projects downwardly into the pond to limit uplifting of the lining sheet.

2. The combination of claim 1 wherein the flange has a preformed hole receiving the pointed shank of the fastener.

3. The combination of claim 2 wherein the fastener is a metal or polymeric stake.

4. The combination of claim 1, 2, or 3, wherein the fastener is one of a plurality of similar fasteners, which are spaced from one another along the flange.

5. The combination of claim 4 wherein the flange is divided into a series of tabs enabling the wall to flex and wherein the pointed shank of each fastener is driven through one of the tabs, through the outer margin of the lining sheet, into the land border of the pond.

* * * * *